US008165121B1

United States Patent
Singh (10) Patent No.: US 8,165,121 B1
(45) Date of Patent: Apr. 24, 2012

(54) FAST COMPUTATION OF LOOP FREE ALTERNATE NEXT HOPS

(75) Inventor: Mitali Singh, Menlo Park, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 390 days.

(21) Appl. No.: 12/489,100

(22) Filed: Jun. 22, 2009

(51) Int. Cl.
*H04L 12/28* (2006.01)
*H04L 12/56* (2006.01)
*H04L 12/26* (2006.01)
*G06F 15/173* (2006.01)

(52) U.S. Cl. ........ 370/389; 370/251; 370/252; 370/351; 370/390; 370/400; 709/239

(58) Field of Classification Search .......... 370/258–503; 709/239

See application file for complete search history.

(56) References Cited

U.S. PATENT DOCUMENTS

| | | | |
|---|---|---|---|
| 7,693,064 B2 * | 4/2010 | Thubert et al. | 370/235 |
| 7,719,960 B2 * | 5/2010 | Atlas et al. | 370/222 |
| 7,830,786 B2 * | 11/2010 | Atlas et al. | 370/217 |
| 7,924,836 B2 * | 4/2011 | Chiabaut et al. | 370/390 |
| 7,990,893 B1 * | 8/2011 | Singh | 370/254 |
| 2002/0004843 A1 * | 1/2002 | Andersson et al. | 709/238 |
| 2002/0093954 A1 * | 7/2002 | Weil et al. | 370/389 |
| 2003/0026268 A1 * | 2/2003 | Navas | 370/400 |
| 2005/0073958 A1 * | 4/2005 | Atlas et al. | 370/238 |
| 2005/0088965 A1 * | 4/2005 | Atlas et al. | 370/216 |
| 2006/0291446 A1 * | 12/2006 | Caldwell et al. | 370/351 |
| 2007/0091811 A1 * | 4/2007 | Thubert et al. | 370/238 |
| 2009/0180400 A1 * | 7/2009 | Chiabaut et al. | 370/255 |

OTHER PUBLICATIONS

A Novel Loop-Free Alternate Interface Selection Criterion for Traffic Deflection in Shortest-Path-First Network, Communications and Networking in China, 2006. ChinaCom '06. First International Conference on Issue Date : Oct. 25-27, 2006,Jinhua Liu ; Yahong Wang ; Hequan Wu.*

Localized minimum spanning tree based multicast routing with energy-efficient guaranteed delivery in ad hoc and sensor networks, World of Wireless, Mobile and Multimedia Networks, 2008. WoWMoM 2008. 2008 International Symposium on a Issue Date : Jun. 23-26, 2008,Frey, H. ; Ingelrest, F. ; Simplot-Ryl, D.*

Atlas et al., "Basic Specification for IP Fast Reroute: Loop-Free Alternates," Network Working Group, RFC 5286, Sep. 2008, 28 pp.

Moy, "OSPF Version 2," Network Working Group, RFC 2328, Apr. 1998, 204 pp.

Callon, "Use of OSI IS-IS for Routing in TCP/IP and Dual Environments," RFC 1195, Dec. 1990, 80 pp.

Wikipedia entry, "Dijkstra's algorithm," last modified Apr. 10, 2009, 6 pp.

* cited by examiner

*Primary Examiner* — Phirin Sam
*Assistant Examiner* — Venkatesh Haliyur
(74) *Attorney, Agent, or Firm* — Shumaker & Sieffert, P.A.

(57) ABSTRACT

A network device includes a route selection module configured to select an alternate next hop to use in forwarding network traffic to a destination in the event a primary next hop becomes unavailable, wherein a path to the destination device associated with the alternate next hop does not send packets through the network device. The route selection module computes optimal distances from neighboring devices to the network device, wherein a number of Shortest Path First (SPF) computations required for computing the optimal distances is independent of the number of neighboring devices in the network, identifies as candidate alternate next hops those neighboring devices having distances to the destination that are less than the sum of the optimal distance from the neighboring device to the network device and the optimal distance from the network device to the destination, and selects the alternate next hop from among the stored candidates.

22 Claims, 4 Drawing Sheets

FAST COMPUTATION OF LOOP FREE ALTERNATE NEXT HOPS

TECHNICAL FIELD

The invention relates to computer networks and, more particularly, to forwarding network traffic within computer networks.

BACKGROUND

A routing protocol defines a process by which network devices, referred to as routers in packet-switched networks, communicate with each other to disseminate information that allows the routers to select routes between any two nodes on a computer network. One type of routing protocol, referred to as a link state protocol, allows routers to exchange and accumulate link state information, i.e., information describing the various links within the network. With a typical link state routing protocol, the routers exchange information related to available interfaces, metrics and other variables associated with network links. This allows a router to construct its own topology or map of the network. Some examples of link state protocols include the Open Shortest Path First (OSPF) protocol and the Intermediate-System to Intermediate System (IS-IS) protocol.

The connection between two devices on a network is generally referred to as a link. Connections between devices of different autonomous systems are referred to as external links while connections between devices within the same autonomous system are referred to as internal links. Many conventional computer networks, including the Internet, are designed to dynamically reroute data packets in the event an individual link fails. Upon failure of a link, the routers transmit new connectivity information to neighboring devices, allowing each device to update its local routing table. Links can fail for any number of reasons, such as failure of the physical infrastructure between the devices, or failure of the devices interfacing with the link.

When a link or router in the network fails, routers using traditional link state protocols such as OSPF and IS-IS may take a long time to adapt their forwarding tables in response to the topological change resulting from node and link failures in the network. The process of adapting the forwarding tables is known as convergence. This time delay occurs because recovery from a failure requires each node to re-compute the shortest path algorithm to calculate the next hop for the affected nodes in the network. Until the next hops are re-computed, traffic being sent toward the failed links may be dropped. Current deployments take time in the order of 500 milliseconds to several seconds for detection and recovery from failures in the network. These large convergence times may adversely affect the performance of Voice over Internet Protocol (VoIP) and multimedia applications, which are extremely sensitive to traffic loss. Service providers are demanding end-to-end failure detection and recovery times to be less than 50 milliseconds.

One approach to reduce failure recovery time is to select an alternate next-hop in addition to the best next-hop for a destination. Along with the best next-hop, the alternate next-hop is installed in the packet forwarding engine. When a link failure occurs, the router uses the alternate next-hop for packet forwarding until the shortest path algorithm has re-computed the next hops for the updated network topology and installed the re-computed next hops in the packet forwarding engine.

SUMMARY

In general, the embodiments of the invention provide efficient convergence of routing tables, such as those implemented when using link state routing protocols like the Open Shortest Path First (OSPF) protocol and the Intermediate-System to Intermediate System (IS-IS) protocol, after a network fault, such as link failure. Specifically, techniques are described for improved methods of identifying loop-free alternate next hops to provide local protection for network traffic in Internet Protocol (IP) networks in the event of a topology change due to a failure. Pre-calculated loop-free alternate next hops are used until the convergence process completes. The techniques provide a fast algorithm for computing the loop-free alternate next hops that requires only two additional Shortest Path First (SPF) computations. The techniques may reduce the packet loss that happens during router convergence after a failure.

For example, a network device includes a route selection module configured to select an alternate next hop to use in forwarding network traffic to a destination in the event a primary next hop becomes unavailable, wherein a path to the destination device associated with the alternate next hop does not send packets through the network device. The route selection module computes optimal distances from neighboring devices to the network device, wherein a number of SPF computations required for computing the optimal distances is independent of the number of neighboring devices in the network. The route selection module identifies as candidate alternate next hops those neighboring devices having distances to the destination that are less than the sum of the optimal distance from the neighboring device to the network device and the optimal distance from the network device to the destination, and selects the alternate next hop from among the stored candidates.

In one embodiment, a method comprises, with a network device, selecting a primary next hop to use in forwarding network traffic from the network device to a destination network device in a network, and wherein selecting the primary next hop comprises selecting the primary next hop based on link-state routing information exchanged using a link-state routing protocol, and, with the network device, selecting an alternate next hop to use in forwarding network traffic from the network device to the destination in the event the primary next hop becomes unavailable, wherein a path to the destination device associated with the alternate next hop does not loop through the network device and wherein selecting the alternate next hop comprises selecting the alternate next hop based on the link-state routing information exchanged using the link-state routing protocol. The method further comprises receiving network traffic destined for the destination, and forwarding the network traffic using one of the primary next hop and the alternate next hop. Selecting the alternate next hop includes computing optimal distances from a plurality of neighboring devices of the network device to the network device, wherein a number of Shortest Path First (SPF) computations required for computing the optimal distances is independent of the number of neighboring devices in the network, identifying as candidate alternate next hops those neighboring devices having distances to the destination that are less than the sum of the optimal distance from the neighboring device to the network device and the optimal distance from the network device to the destination, storing the identified candidate alternate next hops and corresponding distances to the destination, and selecting the alternate next hop from among the stored candidate alternate next hops.

In another embodiment, a network device includes a control unit configured to execute a link-state routing protocol for exchanging link-state routing information to maintain network topology for a network, a physical interface configured to send and receive link-state routing updates in accordance with the link-state routing protocol, a routing engine configured to store routing information based on the link-state routing updates, and a route selection module configured to select a primary next hop to use in forwarding network traffic from the network device to a destination network device, wherein the primary next hop is associated with an optimal distance from the network device to the destination, and the primary next hop is selected based on the routing information. The route selection module is configured to select an alternate next hop to use in forwarding network traffic from the network device to the destination in the event the primary next hop becomes unavailable, wherein a path to the destination device associated with the alternate next hop does not send packets through the network device and wherein the alternate next hop is selected based on the routing information. The route selection module is configured to compute optimal distances from a plurality of neighboring devices of the network device to the network device, wherein a number of Shortest Path First (SPF) computations required for computing the optimal distances is independent of the number of neighboring devices in the network. The route selection module is configured to identify as candidate alternate next hops those neighboring devices having distances to the destination that are less than the sum of the optimal distance from the neighboring device to the network device and the optimal distance from the network device to the destination, store the candidate alternate next hops and corresponding distances to the destination, and select the alternate next hop from among the stored candidate alternate next hops.

In another embodiment, a computer-readable storage medium comprises program instructions. The instructions cause a programmable processor to select a primary next hop to use in forwarding network traffic from a network device to a destination network device in a network, wherein the primary next hop is associated with an optimal distance from the network device to the destination, and wherein selecting the primary next hop comprises selecting the primary next hop based on link-state routing information exchanged using a link-state routing protocol. The instructions also cause the programmable processor to select an alternate next hop to use in forwarding network traffic from the network device to the destination in the event the primary next hop becomes unavailable, wherein a path to the destination device associated with the alternate next hop does not send packets through the network device and wherein selecting the alternate next hop comprises selecting the alternate next hop based on the link-state routing information exchanged using the link-state routing protocol, receive network traffic destined for the destination, and forward the network traffic using one of the primary next hop and the alternate next hop. The instructions to select the alternate next hop comprise instructions for causing the programmable processor to compute optimal distances from a plurality of neighboring devices of the network device to the network device, wherein a number of Shortest Path First (SPF) computations required for computing the optimal distances is independent of the number of neighboring devices in the network, identify as candidate alternate next hops those neighboring devices having distances to the destination that are less than the sum of the optimal distance from the neighboring device to the network device and the optimal distance from the network device to the destination, store the candidate alternate next hops and corresponding distances to the destination, and select the alternate next hop from among the stored candidate alternate next hops.

In a further embodiment, a method includes maintaining routing information at a network device using a link-state routing protocol, with the network device, selecting a primary next hop to use in forwarding network traffic from the network device to a destination network device in a network based on the routing information, and building a graph based on the routing information in which all link directions and link costs in the network are reversed. The method also includes computing optimal distances from a plurality of neighboring devices of the network device to the network device in a single Shortest Path First (SPF) computation based on the graph, based on the computed optimal distances, selecting an alternate next hop to use in forwarding network traffic from the network device to the destination in the event the primary next hop becomes unavailable, wherein a path to the destination device associated with the alternate next hop does not loop through the network device, receiving network traffic destined for the destination, and forwarding the network traffic using one of the primary next hop and the alternate next hop.

The techniques of the invention may provide one or more advantages. For example, the techniques do not require running one SPF computation per neighbor in order to compute the loop-free alternate next hop for a node. Rather, the techniques allow for computing the LFA next hop by running just two SPF calculations and a heuristic. Other approaches may require running an SPF computation for each neighbor in order to compute an LFA next hop for a node. For example, one approach is described in A. Atlas, "Basic Specification for IP Fast Reroute Loop-Free Alternates," Network Working Group, RFC 5286, September 2008. Such an approach may have several drawbacks, such as poor scalability and slower convergence.

Because the LFA next hop selection algorithm proposed herein is not tied to the number of neighbors and therefore requires running fewer SPF calculations, the proposed algorithm may provide better scaling as the number of neighbors increases and may also be useful in networks with more extensive topologies. Further, it may be preferable to run the SPF computations for primary next hops and LFA next hops back-to-back, to avoid synchronization issues. In systems where all routing functionality is implemented in a single daemon, running the SPF computations back-to-back in this manner may be problematic when the SPF computations are time-consuming, because all other routing functionality is blocked until the LFA next hop computation is completed. Thus, reducing the computation time required for computing the LFA next hop results in a faster return by the routing protocol daemon to other routing functionality. This may be particularly useful in circumstances where the type of network traffic is sensitive to packet loss.

As another example, selecting the LFA next hop as the LFA with the shortest distance out of the set of candidate LFA next hops may increase the probability that the selected LFA next hop is the same as that computed by the router in making the next SPF computation while selecting the new primary next hop taking into account the changed network topology. This may avoid micro-looping that might otherwise occur when the node switches from using an LFA next hop to a different new primary next hop.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
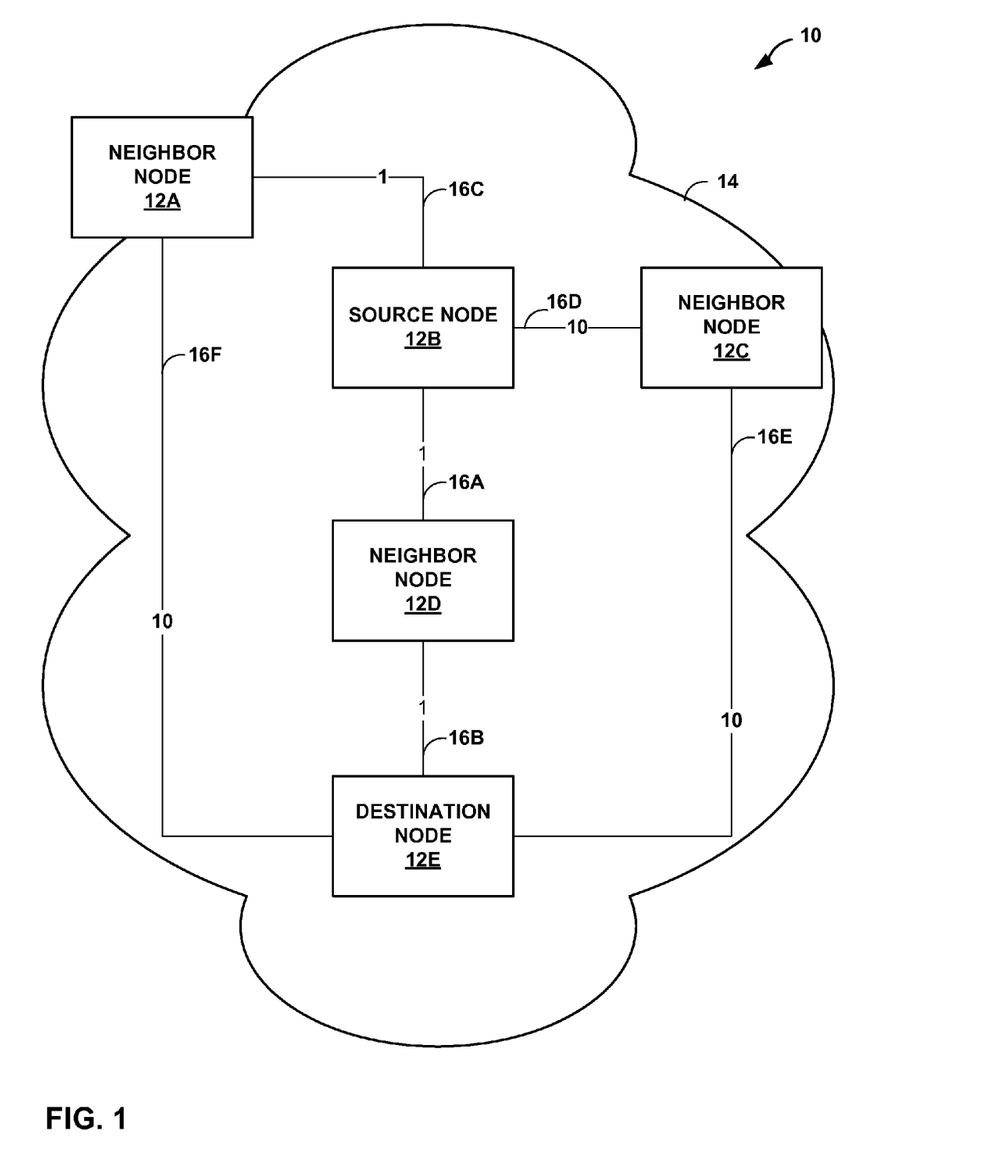
FIG. 1 is a block diagram illustrating an example network that includes devices configured to employ the techniques described herein for efficiently selecting a loop-free alternate (LFA) next hop.

FIG. 1 is a block diagram illustrating a system 10 that includes an example network 14 having network devices 12A-12E (network devices or "nodes" 12) configured to employ the techniques described herein for efficiently selecting a loop-free alternate (LFA) next hop for use in Internet Protocol (IP) fast reroute of network traffic upon a primary next hop becoming unavailable. Network devices 12 may use the techniques described herein to accelerate convergence of routing information after a network fault.

Network devices 12 may be routers, and may use a link-state routing protocol, such as the Open Shortest Path First (OSPF) protocol or the Intermediate-System to Intermediate System (IS-IS) protocol, to exchange link-state routing information to learn the topology of network 14. Although shown for simplicity and purposes of example as including network devices 12A-12E, network 14 may include additional network devices (not shown). Further details regarding OSPF are found in Moy, J., "OSPF Version 2," RFC 2328, April 1998, the entire contents of which are incorporated by reference herein. Further details regarding IS-IS are found in Callon, R., "Use of OSI IS-IS for Routing in TCP/IP and Dual Environments," RFC 1195, December 1990, the entire contents of which are incorporated by reference herein.

Each of network devices 12 may calculate next hops to be used to reach other network devices 12 in network 14 based on the link-state routing information, and may install the calculated next hops in stored forwarding information for forwarding network traffic destined for the other nodes. These next hops may be referred to as "primary next hops." In accordance with the principles of the invention, network devices 12 may also be configured to calculate and install alternate next hops for each destination node.

Example cost metrics associated with links 16A-16F are shown in FIG. 1. For example, links 16A, 16B, and 16C each have an associated cost metric of 1. Links 16D, 16E, and 16F each have an associated cost metric of 10. From the perspective of source node 12B, a primary path for sending network traffic to destination node 12E may be selected to go through neighbor node 12D. Source node 12B may select neighbor node 12D as the primary next hop because neighbor node 12D is the next hop along the shortest path to destination node 12E, i.e., along the path having the lowest total cost associated with all of the links traversed.

Source node 12B may also select an alternate next hop to use for reaching destination node 12E, for use in the event of a failure associated with neighbor node 12D (e.g., a failure of link 16A, a failure of neighbor node 12D itself, or other failure). Source node 12B may be configured to select an alternate next hop using the techniques described herein. An alternate next hop selected by source node 12B must be loop-free, meaning that the next hop will not send the traffic to the destination node 12E on a path that goes back through source node 12B. The loop-free criterion is needed because if the alternate path passed back through source node 12B, the network traffic would encounter the failure at node 12D and would still be dropped.

Nodes 12 of network 14 may be configured to compute the loop-free alternate (LFA) next hops in a computationally efficient matter, as described herein. The process for computing the LFA next hops is as follows. First, source node 12B runs a Shortest Path First (SPF) algorithm to compute the primary next hops. By running this SPF, denoted SPF(S, G), source node 12B calculates the optimal distance from a source S (here, source node 12B) to all other nodes 12 in the network 14, where the network 14 is represented by graph G. The optimal distance is denoted by Distance_opt(S, D), where S is the source and D is the destination.

Source node 12B runs SPF(S, $G_r$) to compute the Distance_opt($N_i$, S) for all neighboring nodes in G. $G_r$ is the graph with identical nodes as in G, but where all the link directions and costs are reversed. Distance_opt(S, $N_i$) in Graph $G_r$ is the same as Distance_opt($N_i$, S) in graph G. The single computation of SPF(S, $G_r$) is used to determine Distance_opt($N_i$, S) for all neighbors N.

Source node 12B runs a heuristic that uses an adapted version of the Dijkstra's Algorithm to compute the LFA next hops. Whereas the conventional Dijkstra's Algorithm stores only the next hop and distance associated with the best path from the source to a node, the adapted version of the Dijkstra's Algorithm additionally stores alternate next hops and the distances associate with them, provided they satisfy the following inequality:

$$\text{Distance}(N_i,D) < \text{Distance\_opt}(N_i,S) + \text{Distance\_opt}(S,D) \quad (1)$$

It is not necessary to compute the optimal distance from a neighbor to the destination, i.e., Distance_opt($N_i$, D), in order to determine whether there exists a loop free path from the neighbor $N_i$ to D. Rather, it is only necessary to find one path from $N_i$ to D that satisfies Inequality (1). In most cases, this can be achieved by evaluating a much smaller set of paths as those required for computing the optimal path from the neighbor to the destination.

The stored alternate next hops found by running the adapted Dijkstra's Algorithm are candidates for the LFA next hop. Source node 12B selects the LFA next hop from among the stored alternate next hops. Source node 12B may store the alternate next hop candidates in the order of distance of path. Source node 12B may select the alternate next hop candidate having the shortest distance of path as the LFA next hop.

In the example of FIG. 1, source node 12B selects neighbor node 12D as the primary next hop, because the path from source node 12B to destination node 12E using neighbor node 12D as the next hop is two. In evaluating neighbor nodes 12A and 12C as potential LFA next hops, source node 12B selects neighbor node 12C as the LFA next hop because neighbor node 12C is the only neighbor that satisfies inequality (1) shown above. That is, the distance from neighbor node 12C to destination node 12E is only ten, which is less than twelve, i.e., the sum of the optimal distance from neighbor node 12C to source node 12B (ten) and the optimal distance from source node 12B to destination node 12E (two).

Neighbor node 12A does not satisfy Inequality (1), because the distance from neighbor node 12A to destination node is 10, which is not less than three, i.e., the sum of the optimal distance from neighbor node 12A to source node 12B (one) and the optimal distance from source node 12B to destination node 12E (two).

After the primary and alternate next hops are installed in forwarding information of source node 12B, upon receiving packets destined for destination node 12E, source node 12B will forward the packets on link 16A to the primary next hop neighbor node 12D, in accordance with the forwarding information. Upon detecting that a failure condition has occurred for the primary next hop, source node 12B immediately starts forwarding the received packets destined for destination node 12E using the alternate next hop associated with destination node 12E without previously needing to perform route resolution or alternate next hop selection. Also upon detecting the failure condition, source node 12B may initiate calculation of a new primary next hop and a new alternate next hop based on the changed network topology. After the new primary next hop and alternate next hop are calculated, source node 12B installs the primary next hop and alternate next hop in forwarding information, and begins forwarding subsequently received packets using the new primary next hop.

Figure 2:
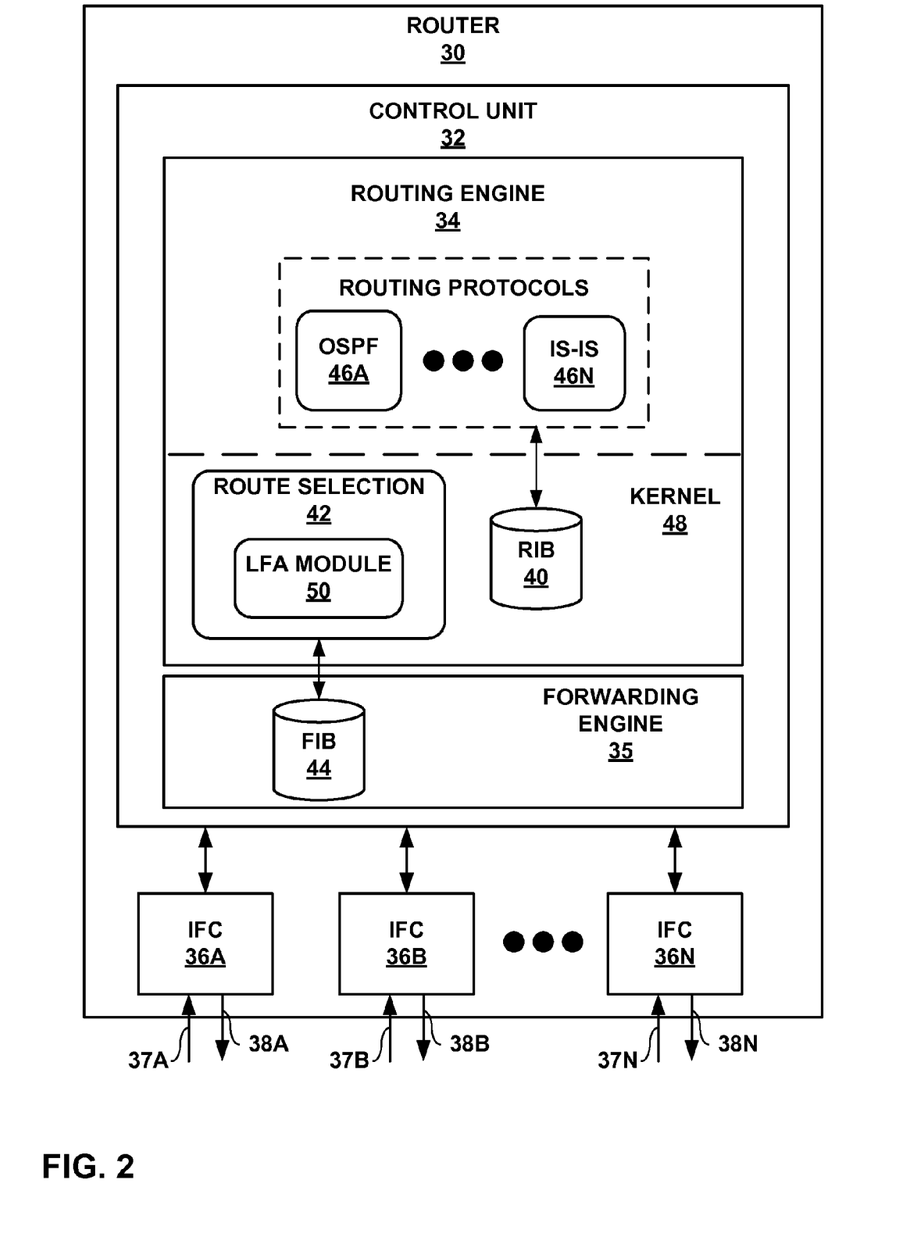
FIG. 2 is a block diagram illustrating an exemplary router having the LFA capability described herein.

FIG. 2 is a block diagram illustrating an exemplary router 30 having the loop-free alternate (LFA) capability described herein. Router 30 includes a control unit 32 that includes a routing engine 34 coupled to a forwarding engine 35. Routing engine 34 provides an operating environment for routing protocols that perform routing operations to execute. Routing engine 34 is responsible for the maintenance of a routing information base (RIB) 40 to reflect the current topology of a network and other network entities to which it is connected. In particular, routing engine 34 periodically updates RIB 40 to accurately reflect the topology of the network and other entities. In accordance with RIB 40, forwarding engine 35 maintains forwarding information base (FIB) 44 that associates network destinations with specific next hops and corresponding interface ports. For example, route selection module 42 analyzes RIB 40 and generates FIB 44 in accordance with RIB 40. Router 30 includes interface cards 36A-36N ("IFCs 36") that receive packets via inbound links 37A-37N ("inbound links 37") and send packets via outbound links 38A-38N ("outbound links 38"). IFCs 36 are typically coupled to links 37, 38 via a number of interface ports (not shown).

Routing engine 34 includes high-level, control plane routing protocols 46A-46N ("routing protocols 46"). Routing protocols 40 may be software processes executing on one or more processors. In the example of FIG. 2, routing protocols 46 include OSPF 46A and IS-IS 46N. Routing engine 34 may include other routing protocols not shown in FIG. 2. Routing protocols 46 interact with kernel 48 to update RIB 40 based on routing protocol messages received by routing node 20. In response, route selection module 42 of kernel 48 generates forwarding information based on the network topology represented in RIB 40. Kernel 48 then programs forwarding engine 35 to install the forwarding information as FIB 44.

Forwarding engine 35 represents hardware and logic functions that provide high-speed forwarding of network traffic. Forwarding engine 35 typically includes a set of one or more forwarding chips programmed with FIB 44 that maps network destinations with specific next hops and the corresponding output interface ports. In general, when router 30 receives a packet via one of inbound links 37, forwarding engine 35 identifies an associated next hop for the data packet by traversing FIB 44 based on information within the packet. Forwarding engine 35 forwards the packet on one of outbound links 38 mapped to the corresponding next hop in accordance with FIB 44.

Route selection module 42 and LFA module 50 cooperate to select and install primary next hops and loop-free alternate (LFA) next hops to FIB 44. Route selection module 42 runs a Shortest Path First (SPF) calculation on the graph G representing network 14 with respect router 30 as the source S to compute a primary next hop to a given destination node in graph G. This SPF calculation is denoted SPF(S, G). Route selection module 42 may obtain information that makes up graph G from RIB 40.

Calculating SPF(S, G) allows route selection module 42 to obtain the optimal distance from source node 12B to all nodes 12 in the network 14 represented by graph G. This optimal distance is denoted by Distance_opt(S, D), and is also used as part of the computation of the LFA next hop. Route selection module 42 selects the next hop having the optimal (e.g., lowest cost) distance as the primary next hop, and installs the selected primary next hop to FIB 44.

For performing the computation of the LFA next hop, LFA module 50 builds a graph $G_r$ based on graph G, in which the directions and costs associated with each of the edges of G are reversed. Using graph $G_r$, LFA module 50 computes SPF(S, $G_r$) using router 30 as the source S. In this way, all of the shortest distances that LFA module 50 computes from router 30 to its neighbors are the same as would have been obtained if LFA module 50 had computed an SPF for each neighbor to obtain the shortest distance from the neighbor to router 30. Thus, by running the single SPF(S, $G_r$) calculation, LFA module 50 computes Distance_opt($N_i$, S) for all ($N_i$, S).

In one embodiment, LFA module 50 stores all qualified alternate next hops (i.e., those next hops that satisfy inequality (1) above) in the order of distance of path using that next hop. LFA module 50 then selects as the LFA next hop the next hop from the list having the shortest distance. Route selection module 42 installs the selected LFA next hop into FIB 44 of forwarding engine 35.

The architecture of router 30 illustrated in FIG. 2 is shown for exemplary purposes only. The disclosure is not limited to this architecture. In other embodiments, router 30 may be configured in a variety of ways. In one embodiment, for example, some of the functionally of routing engine 34 and forwarding engine 35 may be distributed within IFCs 36.

Control unit 32 may be implemented solely in software, or hardware, or may be implemented as combinations of software, hardware, or firmware. For example, control unit 32 may include one or more processors which execute software instructions. In that case, the various software modules of control unit 32 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media.

Figure 3:
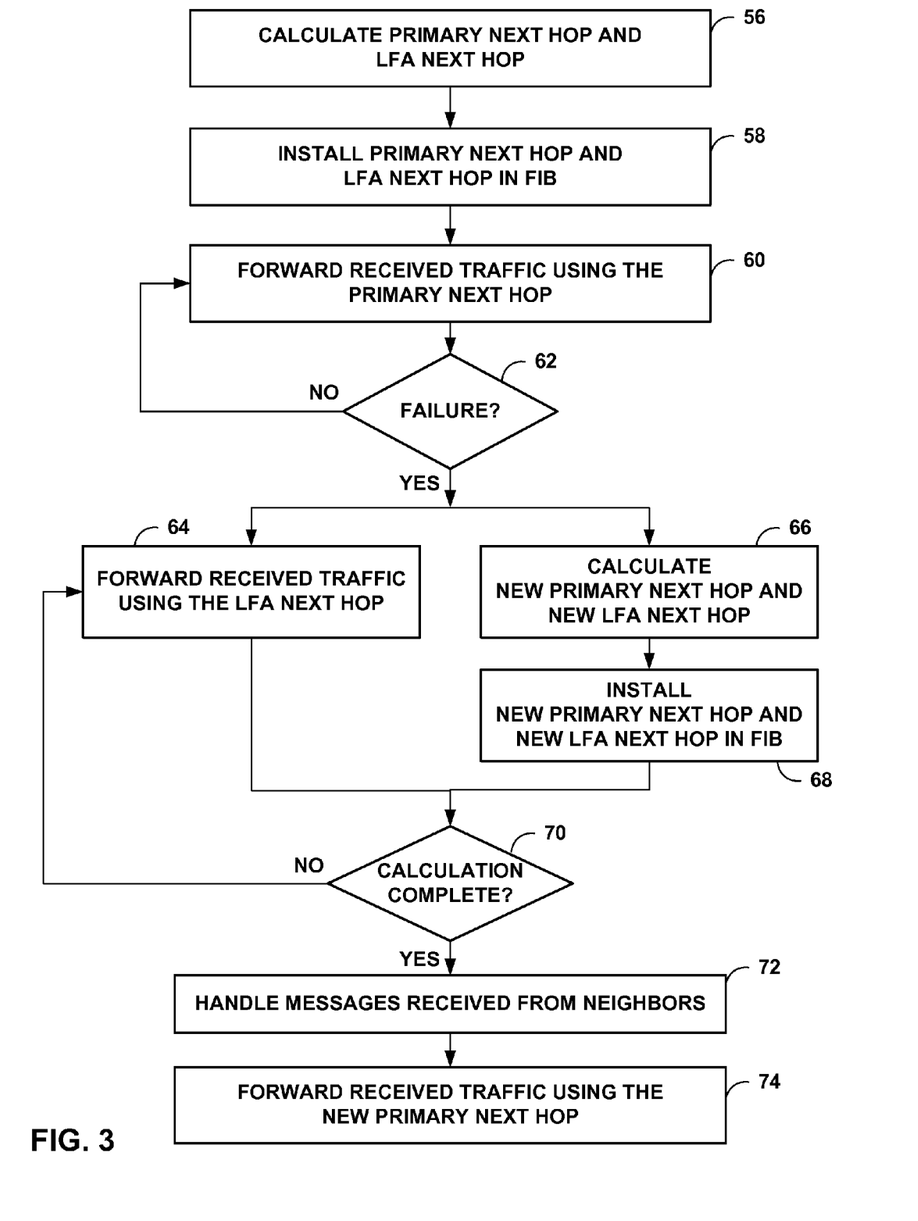
FIG. 3 is a flowchart illustrating an example mode of operation of routers in a network in using the techniques described herein.

FIG. 3 is a flowchart illustrating an example mode of operation of a router in a network in using the techniques described herein. The router may be a router such as source node 12B of FIG. 1 or router 30 of FIG. 2, and FIG. 3 will be described for purposes of example by reference to these exemplary devices.

Each of network devices 12 may calculate primary next hops to be used to reach other network devices 12 in network 14 based on the link-state routing information in its respective RIB 40 (56), and may install the primary next hops in FIB 44 for forwarding network traffic destined for the other nodes 12 (58). For example, source node 12B may select and install neighbor node 12D as the primary next hop for reaching destination node 12E. Source node 12B may also select a loop-free alternate (LFA) next hop to use for reaching destination node 12E, for use in the event of a failure associated with neighbor node 12D, and install the LFA next hop in FIB 44 (56, 58). The specific manner in which source node 12B selects the LFA next hop is described in further detail below with respect to FIG. 4.

After the primary and alternate next hops are installed in forwarding information of source node 12B, upon receiving packets destined for destination node 12E, source node 12B will forward the packets on link 16A to the primary next hop neighbor node 12D, in accordance with FIB 44 (60). Upon detecting that a failure condition has occurred for the primary next hop (62), source node 12B begins forwarding the received packets destined for destination node 12E using the LFA next hop associated with destination node 12E, i.e., using neighbor node 12C (64). Also upon detecting the failure condition, source node 12B also begins calculating a new primary next hop and a new alternate next hop based on the changed network topology (66). After the new primary next hop and alternate next hop are calculated, source node 12B installs the primary next hop and alternate next hop in FIB 44 (68). After the calculation of the primary and LFA next hops are completed (70), source node 12B will handle other messages received from neighbor devices (72), e.g., routing updates. Source node begins forwarding subsequently received packets using the new primary next hop (74).

Figure 4:
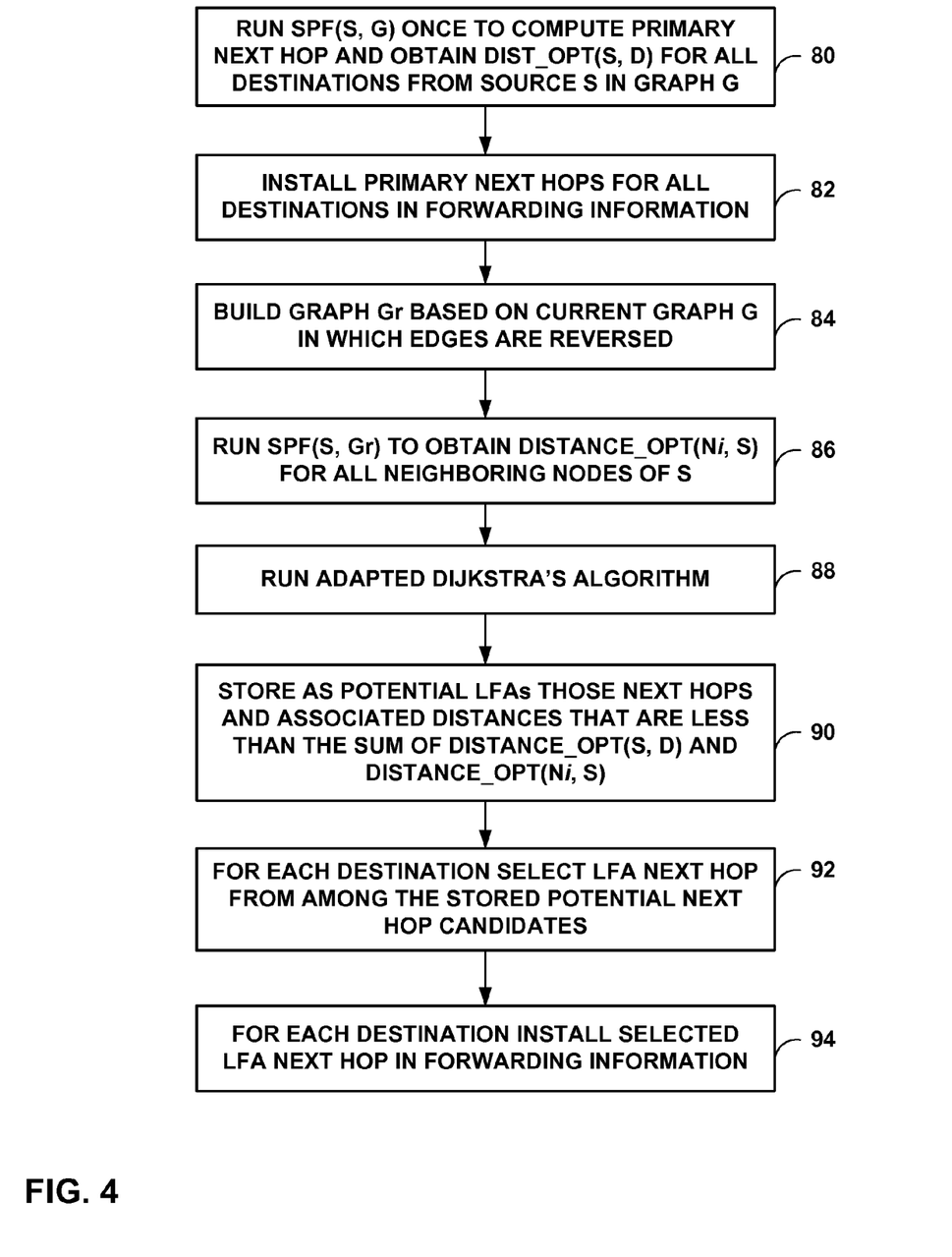
FIG. 4 is a flowchart illustrating an example mode of operation of routers in a network in using the techniques described herein.

FIG. 4 is a flowchart illustrating an example mode of operation of a router in using the techniques described herein to compute loop-free alternate next hops for link-state routing protocols. The router may be a router such as source node 12B of FIG. 1 or router 30 of FIG. 2, and FIG. 4 will be described for purposes of example by reference to these exemplary devices. For a given destination, e.g., destination node 12E, route selection module 42 of source node 12B runs a Shortest Path First (SPF) calculation on the graph G representing network 14 with respect to itself as the source S to compute a primary next hop to destination node 12E. This SPF calculation is denoted SPF(S, G). Route selection module 42 may obtain information that makes up graph G from RIB 40. Calculating SPF(S, G) allows route selection module 42 to obtain the optimal distance from source node 12B to all nodes 12 in the network 14 represented by graph G (80). This optimal distance is denoted by Distance_opt(S, D). Route selection module 42 selects the next hop having the optimal (e.g., lowest cost) distance as the primary next hop, and installs the selected primary next hop to FIB 44 (82).

LFA module 50 builds a graph $G_r$ based on graph G, in which the directions and costs associated with each of the edges of G are reversed (84). Using graph $G_r$, LFA module 50 computes SPF(S, $G_r$) using source node 12B as the source S (86). In this way, all of the shortest distances that LFA module 50 computes from source node 12B to its neighbors are the same as would have been obtained if LFA module 50 had computed an SPF for each neighbor to obtain the shortest distance from the neighbor to the source node 12B. Thus, by running the single SPF(S, $G_r$) calculation, LFA module 50 computes Distance_opt($N_i$, S) for all ($N_i$, S). In terms of network 14 of FIG. 1, this means that LFA module 50 obtains Dist_opt(neighbor node 12A, source node 12B), Dist_opt (neighbor node 12C, source node 12B), and Dist_opt(neighbor node 12D, source node 12B), all from running a single SPF calculation.

LFA module 50 also runs a heuristic consisting of an adapted version of Dijkstra's Algorithm (88) to evaluate alternate paths to the destination. The following exemplary pseudocode sets forth one embodiment of the adapted Dijkstra's Algorithm:

```
function Dijkstra_lfa(Graph, source):
    for each vertex v in Graph:              // Initializations
        dist[v] := infinity                  // Unknown distance function
                                                from source to v
        previous[v] := undefined             // Previous node in optimal
                                                path from source
    dist[source] := 0                        // Distance from source to source
    Q := the set of all nodes in Graph       // All nodes in the graph are
                                                unoptimized - thus are in Q
    while Q is not empty:                    // The main loop
        u := vertex in Q with smallest dist[ ]
        remove u from Q
        for each neighbor v of u:            // where v has not yet been
                                                removed from Q.
            alt := dist[u] + dist_between(u, v)  // be careful in 1st step -
                                                dist[u] is infinity yet
            if alt < dist[v]                 // Relax (u,v,a)
                dist[v] := alt
                previous[v] := u
            else
                for each next-hop h to reach u  // see if next-hops to reach v
                                                   through u are loop free
                    alt_h = dist(u)_next-hop(h)  // distance to reach u using
                                                    h as next-hop
                    if (alt_h < Distance_opt(h, S) + Distance_opt(S, v))
                        add h to next-hop list for v and also store dist(v)_next-hop(h)
    return previous[ ]
```

In the version of Dijkstra's Algorithm shown above, the line 8 searches for the vertex "u" in the vertex set "Q" that has the least dist[u] value. Line 9 removes that vertex from the set "Q" and returns it to the user. In line 11, dist_between(u, v) calculates the length between the two neighbor-nodes "u" and "v." In line 11, "alt" is the length of the path from the root node to the neighbor node "v" if the path were to go through "u." If this path is shorter than the current shortest path recorded for "v," that current path is replaced with this "alt" path. The "previous" array is populated with a pointer to the next hop node on the source graph to get the shortest route to the source.

In the adapted version of Dijkstra's Algorithm shown above, lines 15-20 are added to the original Dijkstra's Algorithm. The running of the adapted Dijkstra's Algorithm provides a heuristic to evaluate alternate paths to a destination. The heuristic does not traverse all possible paths and thus, does not generate all possible LFAs to a destination. However, simulations have shown that at least one LFA per destination was always found.

LFA module 50 uses the adapted Dijkstra's Algorithm to compute Distance($N_i$, D), i.e., the left-hand side of Inequality (1), and compare Distance($N_i$, D) to the sum of Distance_opt ($N_i$, S)+Distance_opt(S, D):

$$\text{Distance}(N_i,D) < \text{Distance\_opt}(N_i,S) + \text{Distance\_opt}(S, D) \quad (1)$$

As shown by the pseudocode above, if Distance($N_i$, D) for a given next hop under test is less than the sum of Distance_opt($N_i$, S)+Distance_opt(S, D), LFA module adds the next hop under test to an alternate next hop candidate list for the source, and also stores the distance Distance($N_i$, D) associated with that next hop (90).

In one embodiment, LFA module 50 stores all qualified alternate next hops (i.e., those next hops that satisfy inequality (1) above) in the order of distance of path using that next hop. LFA module 50 then selects as the LFA next hop the next hop from the list having the shortest distance (92). Route selection module 42 installs the selected LFA next hop into FIB 44 of forwarding engine 35 (94).

In this manner, LFA module 50 does not have to run one SPF computation per neighbor in order to compute the loop-free alternate next hop for a node. Rather, LFA module 50 computes the LFA next hop by running just two SPF calculations and a heuristic.

As applied to the example of FIG. 1, source node 12B selects neighbor node 12D as the primary next hop, because the path from source node 12B to destination node 12E using neighbor node 12D as the next hop is two, which is the optimal path. In evaluating neighbor nodes 12A and 12C as potential LFA next hops, LFA module 50 selects neighbor node 12C as the LFA next hop because neighbor node 12C is the only neighbor that satisfies inequality (1) shown above. That is, the distance from neighbor node 12C to destination node 12E is only ten, which is less than twelve, i.e., the sum of the optimal distance from neighbor node 12C to source node 12B (ten) and the optimal distance from source node 12B to destination node 12E (two).

LFA module 50 determines that neighbor node 12A does not satisfy Inequality (1), because the distance from neighbor node 12A to destination node is 10, which is not less than three, i.e., the sum of the optimal distance from neighbor node 12A to source node 12B (one) and the optimal distance from source node 12B to destination node 12E (two).

Because the number of SPF computations required by the LFA next hop selection algorithm proposed herein is independent of the number of neighbors, the proposed algorithm may provide better scaling as the number of neighbors increases, and may also be useful in networks with more extensive topologies. In fact, when used in networks with dense topologies the techniques described herein may actually be able to find an LFA next hop more quickly.

Reducing the computation time required for computing the LFA next hop is this manner may reduce the duration of routing table convergence, and allows a faster return by the routing protocol daemon to other routing functionality. This may be particularly useful in circumstances where the type of network traffic is sensitive to packet loss, such as for voice or video applications.

As another example, when LFA module 50 selects the LFA next hop as the LFA with the shortest distance out of the set of candidate LFA next hops, this may increase the probability that the selected LFA next hop is the same as that computed by the router 30 in making the next SPF computation while selecting the new primary next hop taking into account the changed network topology. This may avoid micro-looping that might otherwise occur when the node switches from using an LFA next hop to a different new primary next hop.

Various embodiments of the invention have been described. These and other embodiments are within the scope of the following claims.

The invention claimed is:

1. A method comprising:
   with a network device, selecting a primary next hop to use in forwarding network traffic from the network device to a destination network device in a network, and wherein selecting the primary next hop comprises selecting the primary next hop based on link-state routing information exchanged using a link-state routing protocol;
   with the network device, selecting an alternate next hop to use in forwarding network traffic from the network device to the destination in the event the primary next hop becomes unavailable,
   wherein a path to the destination device associated with the alternate next hop does not loop through the network device and wherein selecting the alternate next hop comprises selecting the alternate next hop based on the link-state routing information exchanged using the link-state routing protocol;
   receiving network traffic destined for the destination; and
   forwarding the network traffic using one of the primary next hop and the alternate next hop,
   wherein selecting the alternate next hop comprises:
   computing optimal distances from a plurality of neighboring devices of the network device to the network device, wherein a number of Shortest Path First (SPF) computations required for computing the optimal distances is independent of the number of neighboring devices in the network;
   identifying as candidate alternate next hops those neighboring devices having distances to the destination that are less than the sum of the optimal distance from the neighboring device to the network device and the optimal distance from the network device to the destination;
   storing the identified candidate alternate next hops and corresponding distances to the destination; and selecting the alternate next hop from among the stored candidate alternate next hops.

2. The method of claim 1, wherein selecting the primary next hop comprises:
   computing SPF(S, G), where S comprises the network device and G comprises a graph representing the network, wherein computing SPF(S, G) identifies the optimal distance from the network device to the destination and the corresponding next hop; and
   selecting the corresponding next hop as the primary next hop.

3. The method of claim 1, wherein computing the optimal distances comprises computing the optimal distances in a single SPF computation.

4. The method of claim 3, further comprising building a graph $G_r$ comprising a graph representing a network based on a graph G of the network, in which all link directions and link costs in the graph G are reversed,
   wherein computing the optimal distances in a single SPF computation comprises computing SPF(S, $G_r$), where S is the network device.

5. The method of claim 1, wherein storing the candidate alternate next hops comprises adding the identified candidate alternate next hops to an alternate next hop candidate list, further comprising:
   ordering the alternate next hop candidate list based on a distance to the destination; and
   selecting as the alternate next hop a candidate alternate next hop having the shortest distance to the destination.

6. The method of claim 1, wherein identifying candidate alternate next hops comprises running an adapted version of Dijkstra's Algorithm to discover and store the candidate alternate next hops and corresponding distances to the destination.

7. The method of claim 1, further comprising:
   when the primary next hop is operational, forwarding the network traffic to the destination using the primary next hop; and
   when the primary next hop is not operational, forwarding the network traffic to the destination using the alternate next hop.

8. The method of claim 1, further comprising installing the primary next hop and the alternate next hop in forwarding information of the network device.

9. A network device comprising:
- a control unit configured to execute a link-state routing protocol for exchanging link-state routing information to maintain network topology for a network;
- a physical interface configured to send and receive link-state routing updates in accordance with the link-state routing protocol;
- a routing engine configured to store routing information based on the link-state routing updates;
- a route selection module configured to select a primary next hop to use in forwarding network traffic from the network device to a destination network device, wherein the primary next hop is associated with an optimal distance from the network device to the destination, and the primary next hop is selected based on the routing information;
- wherein the route selection module is configured to select an alternate next hop to use in forwarding network traffic from the network device to the destination in the event the primary next hop becomes unavailable,
- wherein a path to the destination device associated with the alternate next hop does not send packets through the network device and wherein the alternate next hop is selected based on the routing information,
- wherein the route selection module is configured to compute optimal distances from a plurality of neighboring devices of the network device to the network device, wherein a number of Shortest Path First (SPF) computations required for computing the optimal distances is independent of the number of neighboring devices in the network, and wherein the route selection module is configured to identify as candidate alternate next hops those neighboring devices having distances to the destination that are less than the sum of the optimal distance from the neighboring device to the network device and the optimal distance from the network device to the destination, store the candidate alternate next hops and corresponding distances to the destination, and select the alternate next hop from among the stored candidate alternate next hops.

10. The network device of claim 9, wherein the route resolution module is configured to compute SPF(S, G), where S is the network device and G comprises a graph representing the network, wherein computing SPF(S, G) identifies the optimal distance from the network device to the destination and the corresponding next hop, and select the corresponding next hop as the primary next hop.

11. The network device of claim 9, wherein the route resolution module is configured to compute the optimal distances in a single SPF computation.

12. The network device of claim 11, wherein the route resolution module is configured to build a graph $G_r$ comprising a graph representing a network based on a graph G of the network, in which all link directions and link costs in the graph G are reversed, wherein the route resolution module is configured to compute the optimal distances in a single SPF computation by computing SPF(S, $G_r$), where S is the network device.

13. The network device of claim 9, wherein the route resolution module is configured to add the identified candidate alternate next hops to an alternate next hop candidate list, order the alternate next hop candidate list based on a distance to the destination, and select as the alternate next hop a candidate alternate next hop having the shortest distance to the destination.

14. The network device of claim 9, wherein the route resolution module is configured to run an adapted version of Dijkstra's Algorithm to discover and store the candidate alternate next hops and corresponding distances to the destination.

15. The network device of claim 9, further comprising a forwarding engine that maintains forwarding information, wherein the route resolution module is configured to install the primary next hop and the alternate next hop in the forwarding information.

16. The network device of claim 15,
- wherein when the primary next hop is operational, the forwarding engine is configured to forward network traffic to the destination using the primary next hop, and
- wherein when the primary next hop is not operational, the forwarding engine is configured to forward the network traffic to the destination using the alternate next hop.

17. A non-transitory computer-readable storage medium comprising program instructions for causing a programmable processor to:
- select a primary next hop to use in forwarding network traffic from a network device to a destination network device in a network, wherein the primary next hop is associated with an optimal distance from the network device to the destination, and wherein selecting the primary next hop comprises selecting the primary next hop based on link-state routing information exchanged using a link-state routing protocol;
- select an alternate next hop to use in forwarding network traffic from the network device to the destination in the event the primary next hop becomes unavailable,
- wherein a path to the destination device associated with the alternate next hop does not send packets through the network device and wherein selecting the alternate next hop comprises selecting the alternate next hop based on the link-state routing information exchanged using the link-state routing protocol;
- receive network traffic destined for the destination; and
- forward the network traffic using one of the primary next hop and the alternate next hop,
- wherein the instructions to select the alternate next hop comprise instructions for causing the programmable processor to:
- compute optimal distances from a plurality of neighboring devices of the network device to the network device, wherein a number of Shortest Path First (SPF) computations required for computing the optimal distances is independent of the number of neighboring devices in the network;
- identify as candidate alternate next hops those neighboring devices having distances to the destination that are less than the sum of the optimal distance from the neighboring device to the network device and the optimal distance from the network device to the destination; store the candidate alternate next hops and corresponding distances to the destination; and select the alternate next hop from among the stored candidate alternate next hops.

18. The non-transitory computer-readable storage medium of claim 17, wherein the instructions cause the processor to compute the optimal distances in a single SPF computation.

19. The non-transitory computer-readable storage medium of claim 17, wherein the instructions cause the processor to:
- build a graph $G_r$ comprising a graph representing a network based on a graph G of the network, in which all link directions and link costs in the graph G are reversed; and compute the optimal distances by computing SPF(S, $G_r$), where S is the network device.

20. The non-transitory computer-readable storage medium of claim 17, wherein the instructions cause the processor to:
add the identified candidate alternate next hops to an alternate next hop candidate list;
order the alternate next hop candidate list based on a distance to the destination; and
select as the alternate next hop a candidate alternate next hop having the shortest distance to the destination.

21. A method comprising:
maintaining routing information at a network device using a link-state routing protocol;
with the network device, selecting a primary next hop to use in forwarding network traffic from the network device to a destination network device in a network based on the routing information;
building a graph based on the routing information in which all link directions and link costs in the network are reversed;
computing optimal distances from a plurality of neighboring devices of the network device to the network device in a single Shortest Path First (SPF) computation based on the graph;
identifying as candidate alternate next hops those neighboring devices having distances to the destination that are less than the sum of the optimal distance from the neighboring device to the network device and the optimal distance from the network device to the destination;
storing the identified candidate alternate next hops and corresponding distances to the destination;
based on the computed optimal distances, selecting, from among the stored candidate alternate next hops, an alternate next hop to use in forwarding network traffic from the network device to the destination in the event the primary next hop becomes unavailable, wherein a path to the destination device associated with the alternate next hop does not loop through the network device;
receiving network traffic destined for the destination; and
forwarding the network traffic using one of the primary next hop and the alternate next hop.

22. The method of claim 21, wherein a number of SPF computations required for computing the optimal distances is independent of the number of neighboring devices in the network.

\* \* \* \* \*